United States Patent
Orsino et al.

(10) Patent No.: US 12,185,402 B2
(45) Date of Patent: Dec. 31, 2024

(54) METHODS FOR CONFIGURABILITY OF MASTER CELL GROUP/PRIMARY CELL FAST RECOVERY AND RELATED APPARATUSES

(71) Applicant: TELEFONAKTIEBOLAGET LM ERICSSON (PUBL), Stockholm (SE)

(72) Inventors: Antonino Orsino, Kirkkonummi (FI); Oumer Teyeb, Montréal (CA); Stefan Wager, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 391 days.

(21) Appl. No.: 17/629,249

(22) PCT Filed: Aug. 27, 2020

(86) PCT No.: PCT/IB2020/058028
§ 371 (c)(1),
(2) Date: Jan. 21, 2022

(87) PCT Pub. No.: WO2021/038498
PCT Pub. Date: Mar. 4, 2021

(65) Prior Publication Data
US 2022/0264687 A1    Aug. 18, 2022

Related U.S. Application Data

(60) Provisional application No. 62/893,136, filed on Aug. 28, 2019.

(51) Int. Cl.
*H04W 76/19* (2018.01)
*H04W 76/15* (2018.01)
*H04W 76/20* (2018.01)

(52) U.S. Cl.
CPC .......... *H04W 76/19* (2018.02); *H04W 76/15* (2018.02); *H04W 76/20* (2018.02)

(58) Field of Classification Search
CPC ...... H04W 76/15; H04W 76/19; H04W 76/20
See application file for complete search history.

(56) References Cited

U.S. PATENT DOCUMENTS

| 2019/0058509 A1 | 2/2019 | Tomala et al. | |
| 2021/0314826 A1* | 10/2021 | Chang | H04W 36/04 |
| 2021/0377758 A1* | 12/2021 | Fujishiro | H04W 76/10 |

(Continued)

FOREIGN PATENT DOCUMENTS

| CN | 103348733 A | 10/2013 |
| WO | 2018182231 A1 | 10/2018 |
| WO | 2018203306 A1 | 11/2018 |

OTHER PUBLICATIONS

Qualcomm Incorporated, "Fast Recovery from MCG failure", 3GPP TSG-RAN WG2 Meeting #105bis, Xi'an, China, Apr. 8-12, 2019, pp. 1-4, R2-1903067, 3GPP.

(Continued)

*Primary Examiner* — Pao Sinkantarakorn

(57) ABSTRACT

Methods performed by a network node in a radio communication network are provided herein. Operations according to such methods include detecting a radio link failure on a master cell group and indicating to a user equipment whether to use a master cell group fast recovery procedure to avoid a radio resource control re-establishment.

14 Claims, 11 Drawing Sheets

Detect radio link failure on a master cell group — 800

Indicate to UE whether to use master cell group fast recovery procedure to avoid radio resource re-establishment — 802

(56) References Cited

U.S. PATENT DOCUMENTS

2022/0038968 A1* 2/2022 Latheef .............. H04W 36/305
2022/0110180 A1* 4/2022 Jung .................... H04W 76/30
2022/0312282 A1* 9/2022 Chang ............. H04W 36/00835

OTHER PUBLICATIONS

Vivo, "Report of [105#55] [NR/ eCA-DC] MCG failure (vivo)", 3GPP TSG-RAN WG2 Meeting #105bis, Xi'an, China, Apr. 8-12, 2019, pp. 1-24, R2-1903339, 3GPP.

Zte Corporation et al., "MCG fast recovery via SCG", 3GPP TSG-RAN WG2 Meeting #106, Reno, Nevada, USA, May 13-17, 2019, pp. 1-4, R2-1907103, 3GPP.

Rapporteur (Ericsson), "Running CR for 38.331 for CA8 DC enh", 3GPP TSG-RAN WG2 #107, Prague, Czech Republic, Aug. 26-30, 2019, pp. 1-45, R2-1910238, 3GPP.

Rapporteur (Vivo and Ericsson), "Running CR to 37.340 for CA/DC enhancements", 3GPP TSG-RAN WG2 #107, Prague, Czech Republic, Aug. 26-30, 2019, pp. 1-7, R2-1909192, 3GPP.

* cited by examiner

Figure 1
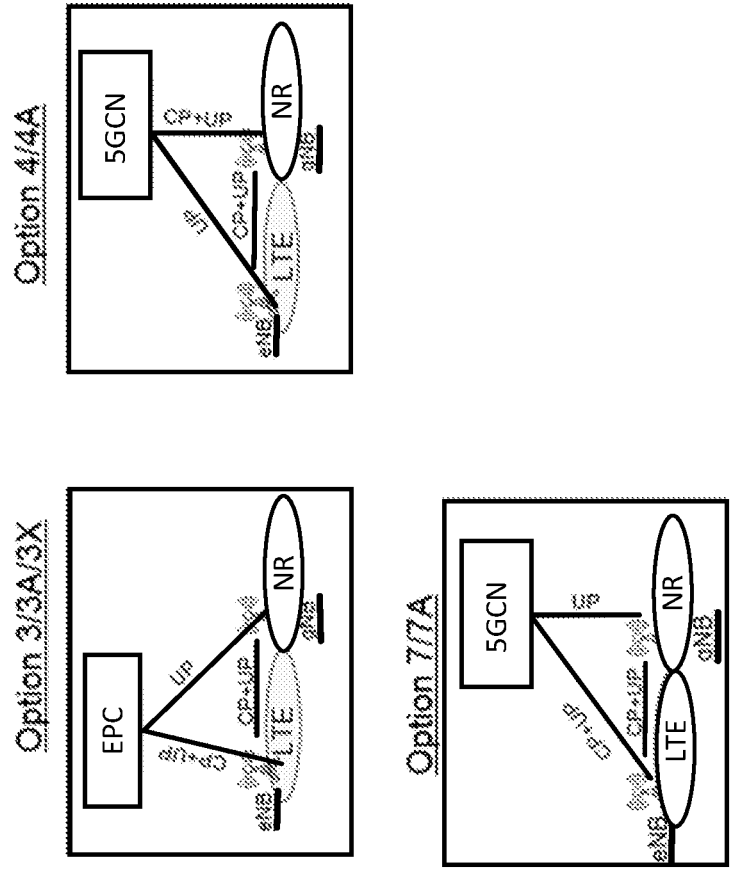
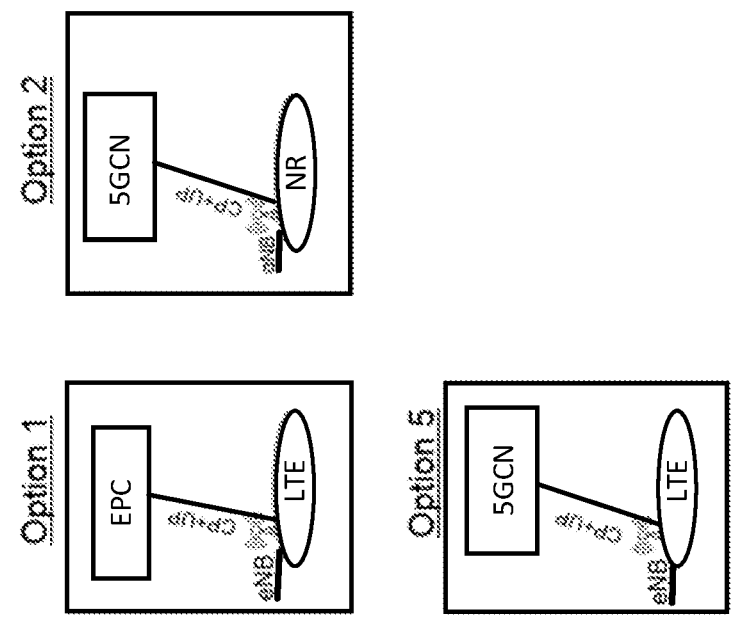

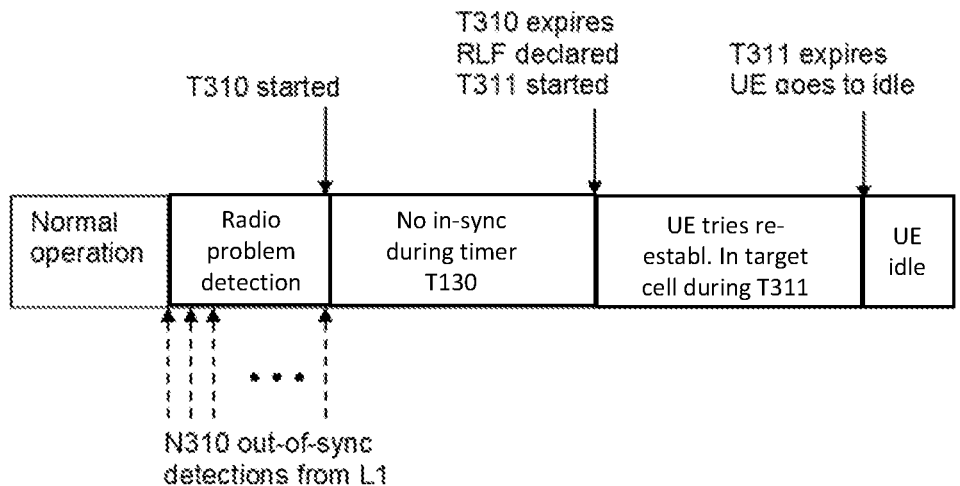

Figure 5

| Timer | Start | Stop | At expiry |
|---|---|---|---|
| T310 | Upon detecting physical layer problems for the SpCell i.e. upon receiving N310 consecutive out-of-sync indications from lower layers. | Upon receiving N311 consecutive in-sync indications from lower layers for the SpCell. upon receiving RRCReconfiguration with reconfigurationWithSync for that cell group, and upon initiating the connection re-establishment procedure. Upon SCG release, if the T310 is kept in SCG. | If the T310 is kept in MCG: If AS security is not activated: go to RRC_IDLE else: initiate the connection re-establishment procedure. If the T310 is kept in SCG, Inform E-UTRAN/NR about the SCG radio link failure by initiating the SCG failure information procedure as specified in 5.7.3. |
| T311 | Upon initiating the RRC connection re-establishment procedure | Upon selection of a suitable NR cell or a cell using another RAT. | Enter RRC_IDLE |

| Constant | Usage |
|---|---|
| N310 | Maximum number of consecutive "out-of-sync" indications for the SpCell received from lower layers |
| N311 | Maximum number of consecutive "in-sync" indications for the SpCell received from lower layers |

Figure 6

METHODS FOR CONFIGURABILITY OF MASTER CELL GROUP/PRIMARY CELL FAST RECOVERY AND RELATED APPARATUSES

The present application is a 371 of International Application No. PCT/IB2020/058028, filed Aug. 27, 2020, which claims the benefit of and priority to U.S. Provisional Patent Application No. 62/893,136, filed Aug. 28, 2019, entitled "METHODS FOR CONFIGURABILITY OF MASTER CELL GROUP/PRIMARY CELL FAST RECOVERY AND RELATED APPARATUSES," the disclosures of which are hereby incorporated herein by reference in their entirety.

TECHNICAL FIELD

The present disclosure relates generally to wireless communications systems and, more particularly, to a network node indicating to user equipment configurability of a master cell group(MCG)/primary cell (PCell) fast recovery procedure.

BACKGROUND

In 3GPP, a dual-connectivity (DC) solution has been specified, both for Long Term Evolution (LTE) and between LTE and New Radio (NR). In DC, two nodes may be involved, a master node (also referred to herein as a MN or MeNB) and a Secondary Node (also referred to herein as a SN or SeNB). Multi-connectivity (MC) is a case when there are more than two nodes involved. It has been proposed in 3GPP that DC is also used in the Ultra Reliable Low Latency Communications (URLLC) cases in order to enhance robustness and avoid or reduce connection interruptions.

SUMMARY

Some embodiments are directed to methods performed by a network node in a radio communication network. Operations corresponding to such methods include detecting a radio link failure on a master cell group and indicating to a user equipment whether to use a master cell group fast recovery procedure to avoid a radio resource control re-establishment.

In some embodiments, the indicating includes at least one indicator that includes an indication that the master cell group fast recovery procedure is supported, an indication that the user equipment use the master cell group fast recovery procedure when defined criteria are met, and an indication that the user equipment use the master cell group fast recovery procedure when a timer for the master cell group fast recovery procedure is present at the user equipment.

Some embodiments provide that indicating to the user equipment includes at least one of sending the indicator to the user equipment in a radio resource connected message indicating whether that the master cell group fast recovery procedure is supported, sending the indicator to the user equipment via a dedicated radio resource control signal indicating whether that the master cell group fast recovery procedure is supported, sending the indicator to the user equipment by using an existing radio resource control message indicating whether that the master cell group fast recovery procedure is supported, and sending the indicator to the user equipment by using a new radio resource control message indicating whether that the master cell group fast recovery procedure is supported.

In some embodiments, indicating to the user equipment includes at least one of sending the indicator to the user equipment in a radio resource control message via a system information block indicating whether the master cell group fast recovery procedure is supported, sending the indicator to the user equipment whether the master cell group fast recovery procedure is supported via a first signal radio bearer, sending the indicator to the user equipment whether the master cell group fast recovery procedure is supported via a split of the first signal radio bearer, sending the indicator to the user equipment whether the master cell group fast recovery procedure is supported via a second radio bearer, including the indicator in an existing system information block indicator, and including the indicator in a new system information block indicator.

In some embodiments, the system information block indicator includes at least one or more of an on/off indicator, a defined indicator including at least one dual connectivity band combination indicating to the user equipment to use the master cell group fast recovery procedure for the at least one dual connectivity band combination, and the defined indicator including at least one dual connectivity band combination triggering the user equipment to use the radio resource control re-establishment.

Some embodiments provide that the system information block indicator is read from at least one of a primary cell and a primary secondary cell.

Some embodiments include configuring the user equipment with multi-radio dual connectivity. In some embodiments, indicating to the user equipment includes an indication included in the configuring indicating whether the user equipment should apply the master cell group fast recovery procedure when the defined criteria are met.

In some embodiments, the defined criteria includes a specified frequency band used by a master cell group and/or a secondary cell group.

Some embodiments include configuring the timer to a value. In some embodiments, the value indicates to the user equipment whether the master cell group fast recovery procedure is supported.

In some embodiments, the user equipment is in a multi-radio dual connectivity, the detecting includes receiving from the user equipment a first indication that a radio link failure has been detected on the master cell group via a signal radio bearer to a secondary node. Operations may further include sending a second indication to the secondary node that the master cell group fast recovery procedure is supported. In some embodiments, sending the second indication includes at least one of including the second indication in an inter-network node message and including the second indication in a message when configuring the multi-radio dual connectivity.

In some embodiments, the network node is a secondary node and the indicating includes receiving a first indication from a master node that the master node does not support the master cell group fast recovery procedure and configuring the user equipment via a signal radio bearer to perform the master cell group fast recovery procedure using the signal radio bearer.

Some embodiments provide that indicating includes applying one or more parameters of a layer of a protocol stack in a secondary cell group. In some embodiments, the one or more parameters includes a defined number of maximum retransmissions on a radio link control set upon sending a report. Some embodiments provide that the report includes a master cell group failure.

Some embodiments include, receiving a report from the user equipment and deciding, based on the report, whether to activate or deactivate the master cell group fast recovery procedure.

In some embodiments, indicating includes activating or deactivating the master cell group fast recovery procedure using a medium access control (MAC) control element comprising at least one of deactivating the master cell group fast recovery procedure by default and requiring the control element to activate the master cell group fast recovery procedure, activating the master cell group fast recovery procedure by default and changing the activating or the deactivating via the control element.

In some embodiments, indicating includes sending the indicator to the user equipment via a dedicated radio resource control signal indicating whether the master cell group fast recovery procedure is supported. In some embodiments, the indicator includes a timer configuration corresponding to the master cell group fast recovery procedure.

Some embodiments provide that the timer configuration includes configuration corresponding to T310 and/or T311.

Some embodiments are directed to a network node for operating in a radio communication network. The network node is configured to detect a radio link failure on a master cell group and indicate to a user equipment whether to use a master cell group fast recovery procedure to avoid a radio resource control re-establishment.

Some embodiments are directed to a computer program that includes program code to be executed by at least one processor of a network node configured to operate in a radio communication network. In some embodiments, execution of the program code causes the network node to perform according to any operations described herein.

Some embodiments are directed to a computer program product that includes a non-transitory storage medium including program code to be executed by at least one processor of a network node configured to operate in a radio communication network. Some embodiments provide that execution of the program code causes the network node to perform according to any operations described herein.

Some embodiments are directed to methods performed by a user equipment in a radio communications network. Operations corresponding to such methods include receiving an indicator indicating when to use a master cell group fast recovery procedure to avoid a radio resource control re-establishment and using the master cell group fast recovery procedure based on the indicator.

In some embodiments, the indicator includes at least one of an indication that the master cell group fast recovery procedure is supported, an indication that the user equipment use the master cell group fast recovery procedure when defined criteria are met, an indication that the user equipment use the master cell group fast recovery procedure when a timer for the master cell group fast recovery procedure is present at the user equipment, a signal level threshold of a secondary cell group for triggering a master cell group fast recovery procedure, wherein the signal level threshold triggers the master cell group fast recovery procedure, the presence or absence of the timer for the user equipment for the master cell group fast recovery procedure. In some embodiments, the timer for the user equipment for the master cell group fast recovery procedure is configured with a value and the value indicates to the user equipment whether the master cell group fast recovery procedure is supported.

In some embodiments, receiving the indicator comprises at least one of receiving the indicator in a radio resource connected message indicating whether that the master cell group fast recovery procedure is supported, receiving the indicator via a dedicated radio resource control signal indicating whether that the master cell group fast recovery procedure is supported, receiving the in an existing radio resource control message indicating whether that the master cell group fast recovery procedure is supported, receiving the indicator in a new radio resource control message indicating whether that the master cell group fast recovery procedure is supported, receiving the indicator in a radio resource control message via a system information block indicating whether the master cell group fast recovery procedure is supported, receiving the indicator via a first signal radio bearer, receiving the indicator via a split of the first signal radio bearer, receiving the indicator via a second radio bearer, receiving the indicator in an existing system information block indicator, and receiving the indicator in a new system information block indicator.

In some embodiments, the system information block indicator include at least one or more of an on/off indicator, a defined indicator including at least one dual connectivity band combination indicating to the user equipment to use the master cell group fast recovery procedure for the at least one dual connectivity band combination, and the defined indicator including at least one dual connectivity band combination triggering the user equipment to use the radio resource control re-establishment.

Some embodiments provide that the system information block indicator is read from at least one of a primary cell and a primary secondary cell.

In some embodiments, the user equipment is configured with multi-radio dual connectivity. In some embodiments, the receiving the indicator includes receiving the indicator in the configuration of the user equipment for multi-radio dual connectivity. Some embodiments provide that the indicator includes an indication for whether the user equipment should use the master cell group fast recovery procedure when the defined criteria are met.

In some embodiments, the defined criteria includes a specified frequency band used by a master cell group and/or a secondary cell group.

Some embodiments provide that the user equipment is in a multi-radio dual connectivity. Some embodiments further include sending a first indication that a radio link failure has been detected on the master cell group via a signal radio bearer to a secondary node and sending a second indication to the secondary node that the master cell group fast recovery procedure is supported. In some embodiments, sending the second indication includes at least one of including the second indication in an inter-network node message and including the second indication in a message when configuring the multi-radio dual connectivity.

Some embodiments provide that the indicator includes receiving a configuration via a signal radio bearer to perform the master cell group fast recovery procedure using the signal radio bearer.

Some embodiments further include triggering a master cell group failure recovery only when a master cell group fast recovery procedure is activated.

Some embodiments further include sending a report that includes information including one or more of a failure of the master cell group fast recovery procedure, a configuration of the user equipment and measurement results of the user equipment.

In some embodiments, receiving the indicator indicating when to use a master cell group fast recovery procedure includes determining the presence or absence of a timer for the user equipment for the master cell group fast recovery procedure.

Some embodiments provide that the presence of the timer for the user equipment for the master cell group fast recovery procedure indicates that the master cell group fast recovery procedure is enabled on the network.

In some embodiments, the absence of the timer for the user equipment for the master cell group fast recovery procedure indicates that the master cell group fast recovery procedure is not enabled on the network. In some embodiments, the timer includes a T310 timer and/or a T311 timer.

Some embodiments are directed to a user equipment for operating in a radio communication network. According to some embodiments, the user equipment configured to receive an indicator indicating when to use a master cell group fast recovery procedure to avoid a radio resource control re-establishment and use the master cell group fast recovery procedure based on the indicator.

Some embodiments are directed to a computer program including program code to be executed by at least one processor of a user equipment configured to operate in a radio communication network. Some embodiments provide that execution of the program code causes the user equipment to perform any operations described herein.

Some embodiments are directed to a computer program product including a non-transitory storage medium including program code to be executed by at least one processor of a user equipment configured to operate in a radio communication network. In some embodiments, execution of the program code causes the user equipment to perform according to any operations described herein.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 1 illustrates some approaches for LTE and NR interworking options;

FIG. 5 illustrates a radio link failure due to physical layer problems;

FIG. 6 illustrates a table of timers, timer starts, timer stops, expiry events, constants and usages;

DETAILED DESCRIPTION

Figure 2:
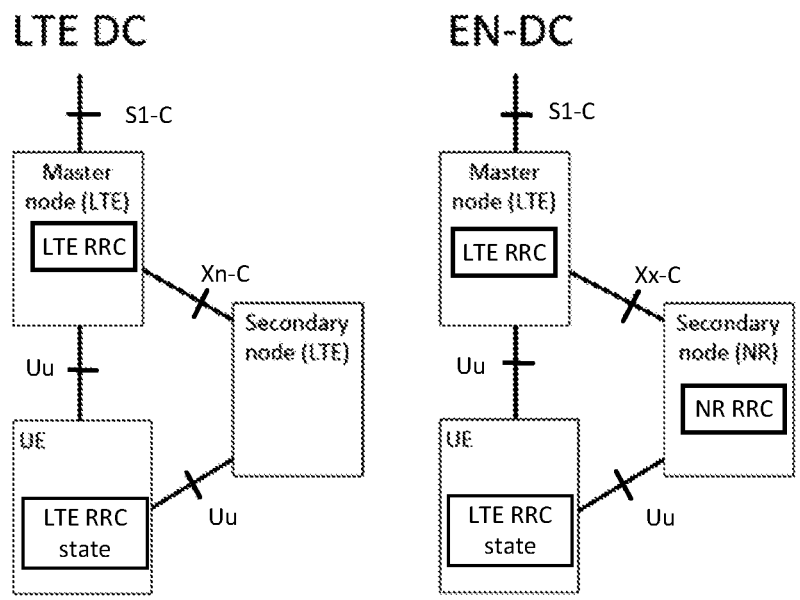
FIG. 2 illustrates a schematic control plane architecture for LTE DC and EN-DC.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter. The term "user equipment" is used in a non-limiting manner and, as explained below, can refer to any type of radio communication terminal/device. The term "UE" herein may be interchangeably replaced with the term "radio terminal," "radio communication terminal," "radio device," "mobile device", "wireless device", "device", or "user equipment". The term "network node" is used in a non-limiting manner and as explained below, can refer to any type of network node in, or in communication with, a radio communication network. The term "network node" herein may be interchangeably replaced with the term master node, secondary node, gNodeB, eNodeB, ng-eNB, NR node, LTE node, a base station, or a node deployed in a cloud environment.

For 3GPP DC, there may be different ways to deploy a 5G network with or without interworking with LTE (also referred to as E-UTRA) and evolved packet core (EPC). FIG. 1 illustrates some approaches for LTE and NR interworking options. In principle, NR and LTE may be deployed without any interworking, denoted by NR stand-alone (SA) operation. Options 1 and 2 illustrated in FIG. 1 illustrate NR SA options that may include a gNodeB (gNB) in NR connected to a 5G core network (5GC) and an eNodeB (eNB) connected to EPC with no interconnection between the two. On the other hand, a first supported version of NR may be referred to as E-UTRAN-NR Dual Connectivity (EN-DC) as illustrated by Option 3 in FIG. 1. In such a deployment, dual connectivity between NR and LTE may be applied with LTE as a master and NR as a secondary node. The RAN node (gNB) supporting NR may not have a control plane connection to core network (EPC), instead it may rely on the LTE as a master node (MeNB). This option may be referred to as "Non-standalone NR". In the case of non-standalone NR, the functionality of a NR cell may be limited and may be used for connected mode user equipment (also referred to herein as UE or UEs) as a booster and/or diversity leg, but an RRC_IDLE UE may not camp on these NR cells With introduction of 5GC, other options may be also valid. As mentioned above, option 2 may support stand-alone NR deployment where a gNB is connected to 5GC.

Similarly, LTE may also be connected to 5GC using option 5 illustrated in FIG. 1 (which also may be referred to as eLTE, E-UTRA/5GC, or LTE/5GC and the node may be referred to as an ng-eNB). In these cases, both NR and LTE are seen as part of the NG-RAN (and both the ng-eNB and the gNB may be referred to as NG-RAN nodes). Options 4 and 7 of FIG. 1 may be other variants of dual connectivity between LTE and NR which may be standardized as part of NG-RAN connected to 5GC, denoted by Multi-Radio Dual Connectivity (MR-DC). The MR-DC umbrella may include:

EN-DC (Option 3 illustrated in FIG. 1): LTE may be the master node and NR may be the secondary (EPC CN employed)

NE-DC (Option 4 illustrated in FIG. 1): NR may be the master node and LTE may be the secondary (5GCN employed)

NGEN-DC (Option 7 illustrated in FIG. 1): LTE may be the master node and NR may be the secondary (5GCN employed)

NR-DC (variant of Option 2 illustrated in FIG. 1): Dual connectivity where both the master and secondary are NR (5GCN employed).

As migration for these options may differ for different operators, it may be possible to have deployments with multiple options in parallel in the same network e.g. there could be an eNB base station supporting option 3, 5 and 7 illustrated in FIG. 1 in the same network as a NR base station supporting options 2 and 4 illustrated in FIG. 1. In combination with dual connectivity solutions between LTE and NR it is also may be possible to support CA (Carrier Aggregation) in each cell group (e.g., master cell group (MCG) and secondary cell group (SCG)) and dual connectivity between nodes on same radio access terminal (RAT) (e.g. NR-NR DC). For the LTE cells, a possible consequence of these different deployments may be the co-existence of LTE cells associated to eNBs connected to EPC, 5GC or both EPC/SGC.

As described above, DC has been standardized for both LTE and E-UTRA-NR DC (EN-DC).

LTE DC and EN-DC are designed differently when it comes to which nodes control what. Generally, there may be two options:

Centralized solution (e.g., LTE-DC); and
Decentralized solution (e.g., EN-DC).

FIG. 2 illustrates a schematic control plane architecture for LTE DC and EN-DC. A difference here may include that in EN-DC, the SN may have a separate RRC entity (NR RRC). This may mean that the SN may control the UE also; sometimes without the knowledge of the MN. The SN may need to coordinate with the MN. In LTE-DC, the RRC decisions may always come from the MN (MN to UE). However, the SN may still decide the configuration of the SN, since it may be only the SN itself that has knowledge of what kind of resources, capabilities etc. the SN has.

For EN-DC, some changes compared to LTE DC may include:

The introduction of split bearer from the SN (which also may be referred to as SCG split bearer);
The introduction of split bearer for RRC; and
The introduction of a direct RRC from a SN (which also may be referred to as SCG SRB)

Figure 3:
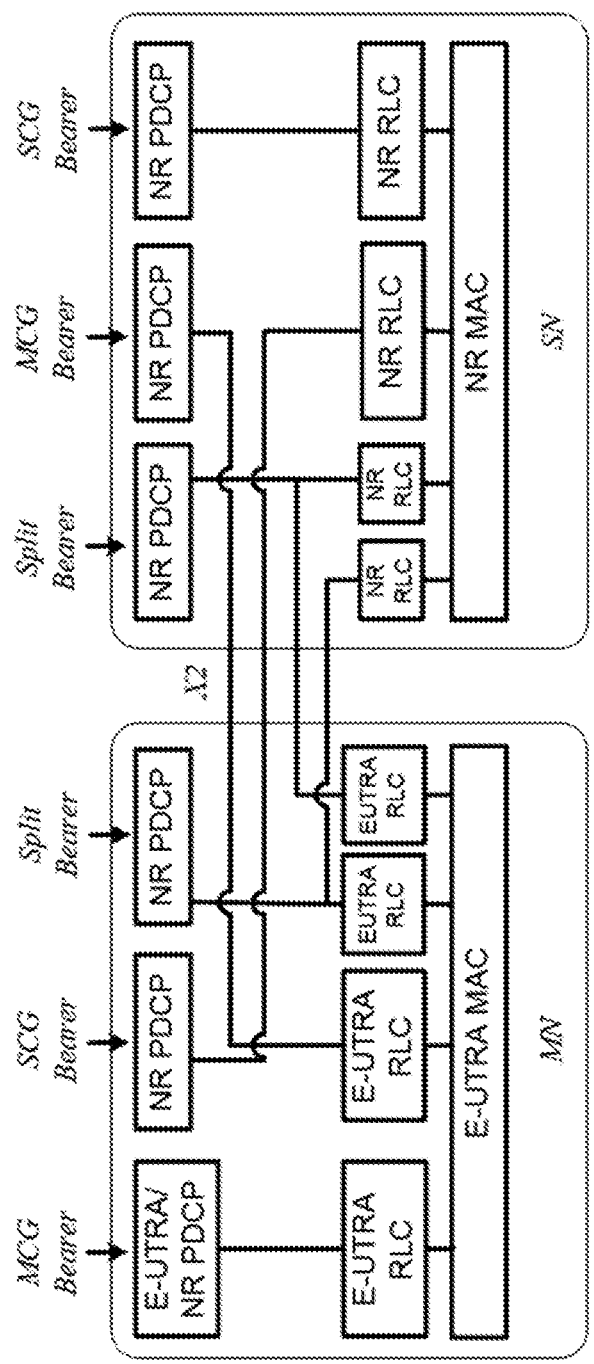
FIG. 3 illustrates some network side protocol termination options for MCG, SCG and split bearers in MR-DC with EPC (EN-DC)
Figure 4:
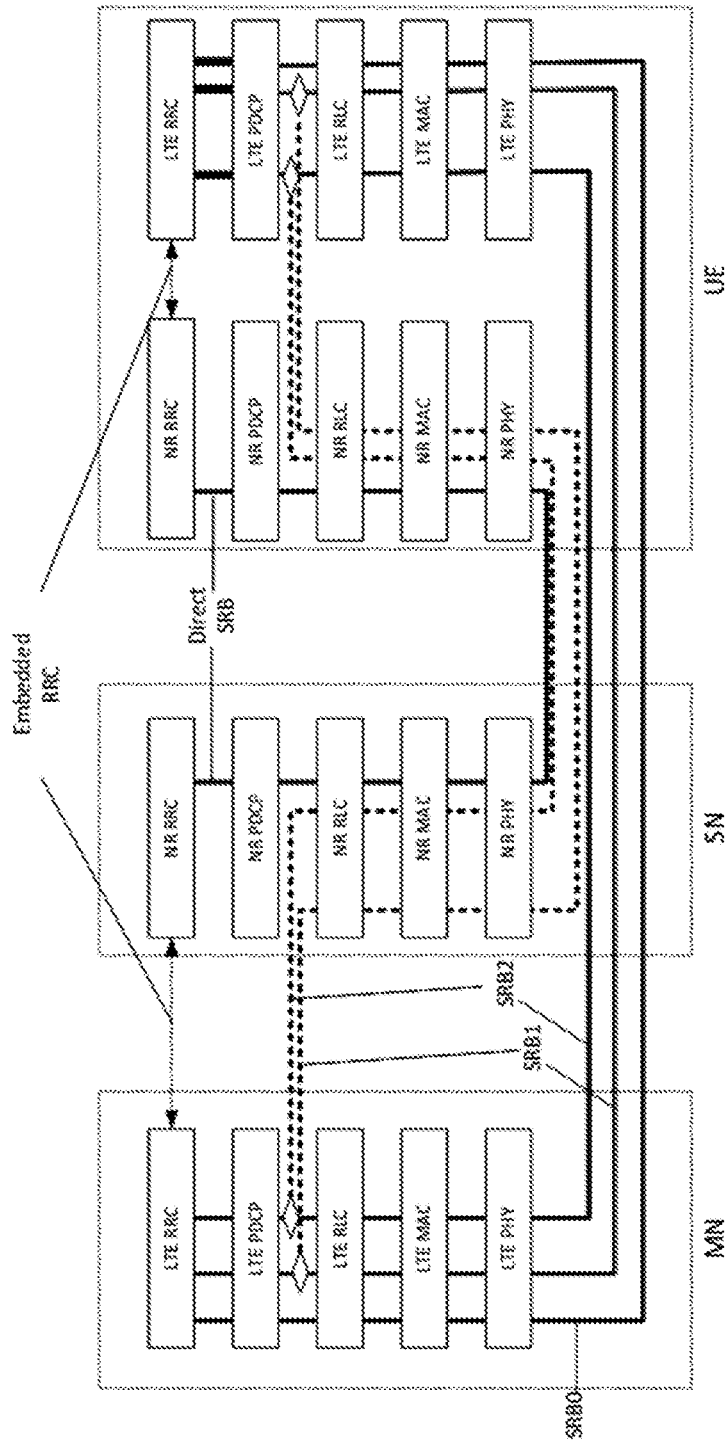
FIG. 4 illustrates an exemplary network architecture for a control plane in EN-DC.

FIGS. 3 and 4 illustrate exemplary user plane (UP) and control plane (CP) architectures for EN-DC.

FIG. 3 illustrates some network side protocol termination options for MCG, SCG and split bearers in MR-DC with EPC (EN-DC).

FIG. 4 illustrates an exemplary network architecture for a control plane in EN-DC.

A SN may sometimes be referred to as a SgNB (where a gNB is a NR base station), and a MN may sometimes be referred to as a MeNB in case the LTE is a master node and NR is a secondary node. In a case where a NR is a master node and a LTE is a secondary node, the corresponding terms may be SeNB and MgNB.

Split RRC messages may mainly be used for creating diversity. The sender may decide to either choose one of the links for scheduling the RRC messages, or it may duplicate the message over both links. In the downlink (DL), the path switching between the MCG or SCG legs or duplication on both may be left to network implementation. On the other hand, for the uplink (UL), the network may configure the UE to use the MCG, SCG or both legs. As used herein, the terms "leg", "path" and "RLC bearer" are used interchangeably.

When carrier aggregation (CA) is configured, a UE may only have one radio resource control (RRC) connection with the network. Further, at a RRC connection establishment/re-establishment/handover, one serving cell may provide the non-access stratum (NAS) mobility information; and at RRC connection re-establishment/handover, one serving cell may provide a security input. This cell may be referred to as a Primary Cell (PCell). In addition, depending on UE capabilities, a secondary cell(s) (SCell(s)) may be configured to form together with the PCell a set of serving cells. The configured set of serving cells for a UE therefore may include one PCell and one or more SCells. Further, when dual connectivity is configured, it may be the case that one carrier under the SCG may be used as the Primary SCell (PSCell). Hence, in this case, there may be one PCell and one or more SCell(s) over the MCG and one PSCell and one or more SCell(s) over the SCG.

The reconfiguration, addition and removal of SCells can be performed by RRC. At intra-RAT handover, RRC may also add, remove, or reconfigure SCells for usage with a target PCell. When adding a new SCell, dedicated RRC signalling may be used for sending required system information of the SCell, e.g. while in connected mode, UEs may not need to acquire broadcasted system information directly from the SCells.

The following explanation of potential problems is a present realization as part of the present disclosure and is not to be construed as previously known by others. While MCG/PCell fast recovery may be supported in Rel-16 and a UE, depending on the network deployment and other factors, MCG/PCell fast recovery may provide inefficiencies. Additionally, a network may not have implemented the Rel-16 feature of MCG/PCell fast recovery.

Radio link failures (RLF) may occur due to physical layer problems.

A UE may lose coverage to the cell that a UE is currently connected to. This may occur in a situation when a UE enters a fading dip, or that a handover was needed as described above, but the handover failed for one or another reason, particularly if a handover region is very short, as will be further described below.

The quality of a radio link may be monitored in the UE, e.g. on the physical layer, as described in 3GPP TS 38.300, TS 38.331 and TS 38.133, and which is summarized below.

Upon detection that the physical layer experiences problems according to criteria defined in TS 38.133, the physical layer may send an indication to the RRC protocol of the detected problems (out-of-sync indication). After a configurable number (N310) of such consecutive indications, a timer (T310) may be started. If the link quality is not improved (recovered) while T310 is running (i.e. there are no N311 consecutive "in-sync" indications from the physical layer), a radio link failure may be declared in the UE, as illustrated in FIG. 5.

FIG. 5 illustrates a radio link failure due to physical layer problems.

Relevant timers and counters described above, and with reference to FIG. 5, are exemplary. A UE may read the timer-values from system information broadcasted in the cell. Alternatively, it is possible to configure the UE with UE-specific values of the timers and constants using dedicated signaling, e.g. where specific values are given to specific UEs with messages directed only to each specific UE.

FIG. 6 illustrates a table of timers, timer starts, timer stops, expiry events, constants and usages.

Referring to FIGS. 5 and 6, if T310 expires for MCG, the UE may initiate a connection re-establishment to recover the ongoing RRC connection. This procedure may include cell selection by the UE. That is, a RRC_CONNECTED UE may try to autonomously find a better cell to connect to, since the connection to the previous cell failed according to the described measurements (it could occur that the UE returns to the first cell anyway, but the same procedure may then be executed). Once a suitable cell is selected (as further described e.g. in TS 38.304), the UE may request to re-establish the connection in the selected cell. It may be important to note the difference in mobility behaviour as an RLF results in UE based cell selection, in contrast to a normally applied network-controlled mobility.

If the re-establishment is successful (which may depend, among other things, if the selected cell and the gNB controlling that cell was prepared to maintain the connection to the UE), then the connection between the UE and the gNB may resume.

A failure of a re-establishment may mean that the UE goes to RRC_IDLE and the connection is released. To continue communication, a brand new RRC connection may then have to be requested and established.

A possible reason for introducing the timers T31x and counters N31x described with reference to FIGS. 5 and 6 may be to add some freedom and hysteresis for configuring criteria for when a radio link should be considered as failed (and recovered). This may be desirable, since it may hurt the end-user performance if a connection is abandoned prematurely if it turned out that the loss of link quality was temporary, and the UE succeeded in recovering the connection without any further actions or procedures (e.g. before T310 expires, or before the counting reaches value N310).

Procedures for NR radio link failure detection related actions from 3GPP TS 38.331 are described in 5.3.10.

In radio access network group 2 (RAN2) meetings, inclusion of a MCG fast recovery procedure in 3GPP was discussed with details still under discussion. The following description is based on the discussions and is not presently included in 3GPP specifications.

The discussions may have included:
SCG/MCG failure handling (37.340→R2-1909192)

If radio link failure is detected for MCG, and fast MCG link recovery can be used, the UE can report the failure via SCG, if configured. Otherwise, the UE may initiate the RRC connection re-establishment procedure.

The following MCG failure case may trigger fast MCG link recovery:
MCG RLF;

During fast MCG link recovery, the UE may suspend MCG transmissions for all radio bearers and may report the MCG Failure Information to the MN via the SCG, using the SCG leg of split SRB1 (if configured), instead of triggering re-establishment.

If MCG failure information can be sent via SRB3 it may be for further study (FFS).

The UE may include in a MCG Failure Information message the measurement results available according to current measurement configuration of both the MN and the SN. Once the MCG failure indication is triggered, UE may maintain the current measurement configurations from both the MN and the SN, and may continue measurements based on configuration from the MN and the SN, if possible.

It may be FFS whether MCG failure can be reported via SCells.

FFS whether a guand timer is needed for MCG Failure Indication

FFS whether UE needs to switch the primaryPath to SCG

Upon reception of the MCG Failure Indication, MN can send RRC Rconfiguration with sync message or RRC Release message to UE, using the SCG leg of split SRB1. At reception of RRC Rconfiguration with sync message, UE can resume MCG transmissions for all radio bearers, if suspended.

The following SCG failure cases may be supported:
SCG RLF;
SN change failure;
For EN-DC, NGEN-DC and NR-DC, SCG configuration failure (only for messages on SRB3);
For EN-DC, NGEN-DC and NR-DC, SCG RRC integrity check failure (on SRB3).

Upon SCG failure, if MCG transmissions of radio bearers are not suspended, the UE may suspend SCG transmissions for all radio bearers and may report the SCG Failure Information to the MN, instead of triggering re-establishment. If SCG failure is detected while MCG transmissions of radio bearers are suspended, then UE may initiate RRC re-establishment procedure.

In all SCG failure cases, the UE may maintain the current measurement configurations from both the MN and the SN and the UE may continue measurements based on configuration from the MN and the SN if possible. The SN measurements configured to be routed via the MN may continue to be reported after the SCG failure.

It may be noted that a UE may not continue measurements based on configuration from the SN after SCG failure in certain cases (e.g. UE cannot maintain the timing of PSCell).

The UE may include in a SCG Failure Information message the measurement results available according to current measurement configuration of both the MN and the SN. The MN may handles the SCG Failure Information message and may decide to keep, change, or release the SN/SCG. In all the cases, the measurement results according to the SN configuration and the SCG failure type may be forwarded to the old SN and/or to the new SN.

Figure 7:
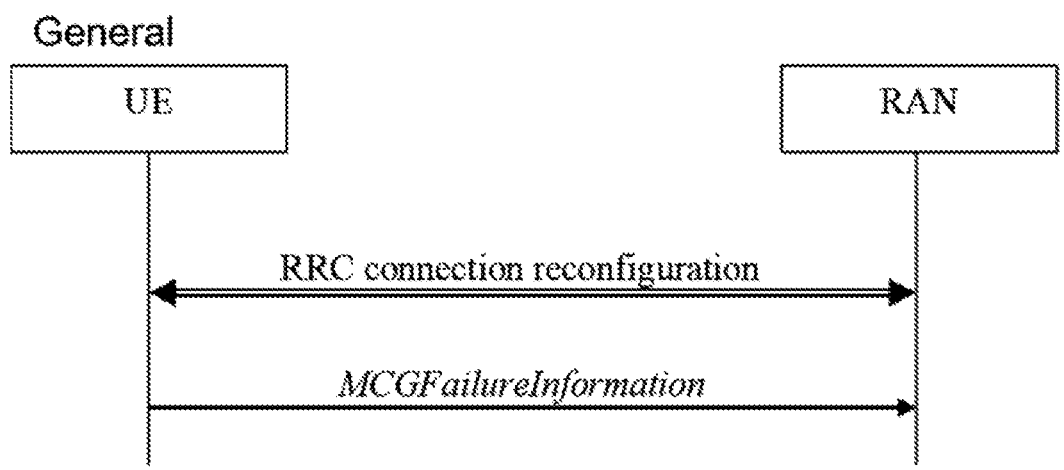
FIG. 7 illustrates a message sequence for a MCG failure information exchanged between a UE and a radio access node.

FIG. 7 illustrates a message sequence for a MCG failure information exchanged between a UE and a radio access node (RAN, also referred to herein as a network node).

A purpose of MCG failure information procedure may be to inform NR MN about an MCG failure the UE has experienced, e.g. MCG radio link failure.

5.7.y.2 Initiation

A UE configured with split signal radio bearer 1 (SRB1) may initiate the procedure to report MCG failures when SCG transmission is not suspended and when the following condition is met:

1> upon detecting radio link failure of the MCG, in accordance with 5.3.10.3 Upon initiating the procedure, the UE shall:
1> suspend MCG transmission for all SRBs and DRBs;
1> reset MCG-MAC;
1> initiate transmission of the MCGFailureInformation message in accordance with 5.7.y.5.

5.7.y.3 Failure type determination
The UE may set the MCG failure type as follows:
1> if the UE initiates transmission of the MCGFailureInformation message due to T310 expiry:
2> set the failureType as t310-Expiry;
1> else if the UE initiates transmission of the MCGFailureInformation message to provide random access problem indication from MCG MAC:
2> set the failureType as randomAccessProblem;
1> else if the UE initiates transmission of the MCGFailureInformation message to provide indication from MCG RLC that the maximum number of retransmissions has been reached:
2> set the failureType as rlc-MaxNumRetx;

5.7.y.4 Setting the contents of MeasResultMCG-Failure
The UE shall set the contents of the MeasResultMCG-Failure as follows:
FFS how to capture inclusion of MCG, SCG and non-serving cell measurement results 5.7.y.5 Actions related to transmission of MCGFailureInformation message
The UE may set the contents of the MCGFailureInformation message as follows:
1> include and set failureType in accordance with 5.7.y.3;
1> include and set MeasResultMCG-Failure in accordance with 5.7.y.4;
The UE shall submit the MCGFailureInformation message to lower layers for transmission.

While it may have been agreed or discussed in 3GPP RAN2 meetings that a MCG fast recovery procedure may be provided, in MR-DC a MCG fast recovery may be supported in Rel-16 and the UE, in case of RLF detected on the MCG, the network should send an indication via the SCG leg of the split SRB to the MCG. However, depending on the deployment and on which frequencies the MCG and SCG are configured, it may be more efficient to perform the legacy RRC re-establishment rather than try to recovery the RRC connection. For example, if both the MCG and SCG are deployed on frequency range 2 (FR2), or if there is a strong correlation between RLF on MCG and SCG, recovery via RRC re-establishment could be preferred. Otherwise, e.g. if MCG failure recovery is applied, the UE may be disconnected for twice the RLF detection time. The first RLF detection time to detect the MCG RLF, then MCG failure report sent over the SCG, and the RLF detection time to detect the SCG RLF, followed by re-establishment. If re-establishment was triggered upon the MCG RLF, then the UE interruption time may be reduced by half.

There may also be the possibility that a network has not implemented the Rel-16 feature of MCG fast recovery (also referred to as MCG failure information).

It may be noted that some of the same problems may be applied also in case the failure happens on a PCell and the UE trys to avoid the RRC Re-establishment procedure by applying some recovery mechanisms, e.g., sending an indication of the detected PCell-RLF over the SCell.

As used herein, the use of the terms "master cell group fast recovery procedure" and "master cell group/PCell fast recovery procedure" (MCG/PCell fast recovery procedure) include, and are not limited to, a master cell group fast recovery procedure and/or a PCell fast recovery procedure.

In various embodiments, a method may be provided for a radio communication network node to indicate to a UE whether a MCG/PCell fast recovery procedure should be used or not.

In some embodiments, if a UE timer (e.g. timeout timer) is used for the MCG/PCell fast recovery procedure (e.g. a timer that is started upon the detection of a MCG failure and a start of MCG failure recovery, and if it expires before the UE gets a reconfiguration that changes the PCell, re-establishment is triggered), then not configuring that timer can be used as an indication that the MCG/PCell fast recovery mechanism should not be used by the UE. Alternatively, the value 0 may be used to implicitly indicate to the UE that the MCG/PCell fast recovery mechanism should not be used.

In some embodiments, an indication of whether the MCG/PCell fast recovery mechanism should be used by a UE may be sent by the network by an explicit indication in RRC messages e.g., in the RRCReconfiguration message (e.g. included in existing Information Element RLF-TimersAndConstants or ServingCellConfig). This may be an explicit indication that the UE needs (or not) to use the MCG fast recovery. Similarly, there may be explicit indication in X2/Xn messages (e.g. SN addition) to coordinate between MN and SN whether MCG/PCell fast recovery is to be configured, or not, depending on the network support for the feature.

In some embodiments, an indication of whether the network supports (or not) the MCG/PCell fast recovery mechanism is added in one of the system information block(s) (SIB(s)) messages (e.g., SIB1) and the UE may trigger the MCG fast recovery only if the current serving cell supports it. In one embodiment, the SIB indication may be read from the PCell. In another embodiment, the SIB indication may be read from the PSCell. The UE also may trigger the MCG fast recovery only if both the PCell and PSCell indicate in their SIB that they support this feature.

In some embodiments, the network may activate or deactivate the MCG fast recovery using a medium access control (MAC) control element (CE). The UE may trigger MCG failure recovery only when it was activated. In one embodiment, the feature may be deactivated by default and a MAC CE may be required to activate it. In another embodiment, the feature may be active by default. In another embodiment, the activation/deactivation state can be configured initially via RRC (e.g. RRCReconfiguration that sets up the SCG), and can be changed via MAC CE after that.

In some embodiments, a UE capability may be introduced and only UEs supporting MCG failure recovery may initiate the MCG failure recovery procedure.

In some embodiments, in MR-DC, the MN may signal whether or not it supports the MCG fast recovery to the SN (e.g., during SN addition) and the SN may take different action based on this (e.g., reconfigure or re-establish the UE autonomously via signal radio bearer 3 (SRB3) or forward the RLF indication to the MN that then takes actions).

Various embodiments may be applied in combination.

While some embodiments are described for a NR case (e.g. the modification for the NR such as changes to NR SIB and NR RRCReconfiguration messages are equally applicable to LIE SIB and LIE RRCConnectionReconfiguration), the embodiments are not so limited. For example, various embodiments may be applicable to cases where a MN is an LIE or a NR base station.

Various embodiments may include cases where a RLF is detected on a MCG/PCell. As used herein, the terms "master cell group" and MCG include a master cell group (MCG) and/or a PCell (MCG/PCell). When such a RLF is detected, the network may have the flexibility to indicate whether the UE should use the MCG/PCell fast recovery or not in order to avoid RRC Re-establishment.

In some embodiments, the network may provide an indication to a UE in RRC_CONNECTED that a MCG/PCell fast recovery procedure is supported (or not supported). In one embodiment, this indication may be sent to the UE via dedicated RRC signaling (e.g., RRCReconfiguration). In another embodiment, the indication provided by the network may be sent by using another existing RRC message. In another embodiment, the indication provided by the network may be sent by using a new RRC message.

In some embodiments, the network, upon configuring a UE with MR-DC (e.g., adding an SCG configuration via RRCReconfiguration), the network may indicate to the UE whether it should apply the MCG fast recovery or not depending on several factors such the frequency bands used by the MCG and SCG serving cells.

In some embodiments, if there are UE-specific timers related the MCG/PCell fast recovery that may need to be configured on the UE-side by the network, the presence (or absence) or these timers indicates whether the MCG/PCell fast recovery procedure is supported or not. In another embodiment, if there are UE-specific timers related the MCG/PCell fast recovery that may need to be configured on the UE-side by the network, the network may set these timers to a specific value (e.g., 0 or infinity) to signal the UE that the MCG/PCell fast recovery procedure is supported or not.

In some embodiments, the network may provide an indication to a UE in RRC_IDLE/RRC_INACTIVE that the MCG/PCell fast recovery mechanism is supported (or not supported) via SIB. In one embodiment, the network may add an indication to signal to the UE whether the MCG/PCell fast recovery mechanism is supported in an existing SIB e.g., SIB1. In another embodiment, the network may add an indication to signal to the UE whether the MCG/PCell fast recovery mechanism is supported in a new SIB.

The SIB indication may be a simple on/off indicator, or it may be a detailed indicator that includes for which DC band combinations the MCG fast recovery should be used and for which the UE should trigger re-establishment directly. The UE, then may apply appropriate behavior depending on the frequency bands used by the MCG and SCG and comparing them with the broadcast information in the SIB.

In some embodiments, in MR-DC in case of MCG fast recovery, a UE may send an indication that an RLF has been detected on the MCG via the SRB3 to the SN. In such a case, in one embodiment upon adding an SN, the MN may send an indication to the SN that the MCG fast recovery mechanism is supported. In another embodiment, such indication may be added in one of the inter-node RRC messages e.g., CG-ConfigInfo. Alternatively, in another embodiment, such indication may be added in one of the X2/Xn messages used upon configuring MR-DC e.g., S-NODE ADDITION/MODIFICATION REQUEST, or S-NODE CHANGE REQUIRED.

In some embodiments, upon receiving an indication from a MN that the MN does not support a MCG fast recovery mechanism, the SN can configure the UE via SRB3 to perform PCell/MCG fast recovery by reporting via SRB3, given that the SN configures the UE with SRB3. Then, when receiving the MCGFailureInformation from the UE via SRB3, the SN can autonomously decide the actions to perform, e.g. (re)configure or re-establish the UE via the SRB3 (e.g., if the SN supports the MCG fast recovery mechanism). In another embodiment, upon receiving an indication from the MN that the MN does support the MCG fast recovery mechanism, the SN can configure the UE with SRB3. Then, when receiving the MCGFailureInformation from the UE via SRB3, the SN forwards the MCGFailureInformation to the MN that takes the necessary actions.

In some embodiments, a MN may send an indication to the UE that a MCG fast recovery mechanism is supported (or not) via the SRB1. In another embodiment, the MN may send the indication to the UE that the MCG fast recovery mechanism is supported (or not) via the split SRB1. In another embodiment, the SN may send the indication to the UE that the MCG fast recovery mechanism is supported (or not) via SRB3.

In some embodiments, a UE, upon re-establishment due to a failed MCG fast recovery, may include a report (e.g. in the RLF report) that was the case (e.g., MCG fast recovery had failed), and possibly with additional information such as its configuration (e.g. frequencies used by the PCell and SCell), measurement results, etc. The network can collect such RLF reports and use them to decide whether to activate/deactivate MCG fast recovery. For example, if the number of times the MCG fast recovery fails (as indicated from these reports) is significantly more than the that it succeeds (as can be gathered by collecting the information on how many MCG fast recovery reports were successfully received by the network and PCell changed), the network can disable the feature (either for all UEs or DC band combinations, of for a particular band combination, if this failures seem to occur mainly for certain band combinations).

In some embodiments, the UE can be also be configured with signal level thresholds on a SCG side in order to trigger a MCG failure recovery or not. For example, the UE can be configured to trigger the MCG failure recovery only when the PSCell and/or one of the SCG SCells have a signal level greater than a threshold value.

In some embodiments, for a fast MCG recovery, different L2 parameters can be applied in a SCG as compared to sending other split SRB1 messages. For example, the maximum retransmissions on a RLC can be set to a value of 1 upon sending the MCG failure report. This way, the SCG may have only one chance to transmit the packet, and thus may trigger the re-establishment faster than if the maximum retransmission value was set to 4, for example, thereby possibly saving considerable time that could have been lost doing unsuccessful retransmissions.

Presently disclosed embodiments may provide potential advantages including, but not limited to, allowing a network to have flexibility regarding whether the MCG/PCell fast recovery should be used or not by the UE when an RLF on the MCG/PCell is detected. Thus, the network may be able to apply the MCG failure recovery only when it is beneficial and can reduce UE interruption time, depending on the network deployment, current bands used for DC by the UE, current signal level towards the SCG, etc.

These and other related operations will now be described in the context of the operational flowcharts of FIGS. 8-16. FIGS. 8-12 are flowcharts of operations that may be performed by a network node. FIGS. 13-16 are flowcharts of operations that may be performed by a UE.

Figure 8:
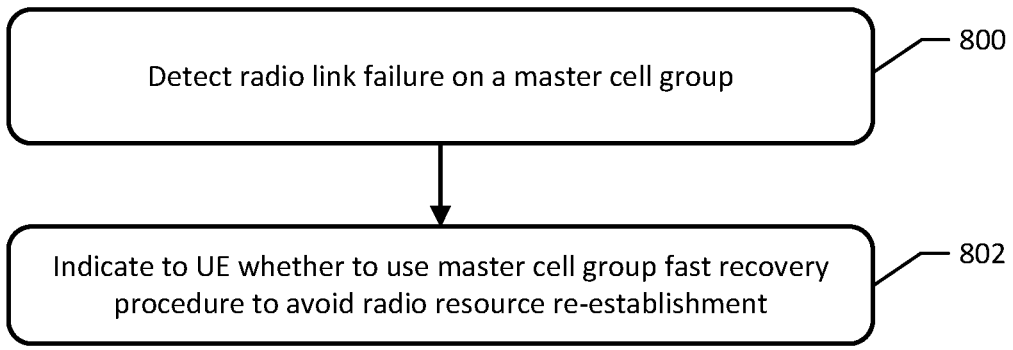
FIGS. 8-12 are flowcharts of operations that may be performed by a network node, in accordance with some embodiments of the present disclosure.

Referring initially to FIG. 8, operations can be performed by a network node (e.g., 1800 in FIG. 18) in a radio communication network. The operations include detecting 800 a radio link failure on a master cell group. The operations further include indicating 802 to a user equipment 1700 whether to use a master cell group fast recovery procedure to avoid a radio resource control re-establishment.

In some embodiments, the indicating 802 may include at least one indicator including: an indication that the master cell group fast recovery procedure is supported; an indication that the user equipment use the master cell group fast recovery procedure when defined criteria are met; and an indication that the user equipment use the master cell group fast recovery procedure when a timer for the master cell group fast recovery procedure is present at the user equipment.

In some embodiments, the indicating 802 to the user equipment may include at least one of:
- sending the indicator to the user equipment in a radio resource connected message indicating whether that the master cell group fast recovery procedure is supported;
- sending the indicator to the user equipment via a dedicated radio resource control signal indicating whether that the master cell group fast recovery procedure is supported;
- sending the indicator to the user equipment by using an existing radio resource control message indicating whether that the master cell group fast recovery procedure is supported;
- sending the indicator to the user equipment by using a new radio resource control message indicating whether that the master cell group fast recovery procedure is supported;
- sending the indicator to the user equipment in a radio resource control message via a system information block indicating whether the master cell group fast recovery procedure is supported;
- sending the indicator to the user equipment whether the master cell group fast recovery procedure is supported via a first signal radio bearer;
- sending the indicator to the user equipment whether the master cell group fast recovery procedure is supported via a split of the first signal radio bearer;
- sending the indicator to the user equipment whether the master cell group fast recovery procedure is supported via a second radio bearer;
- including the indicator in an existing system information block indicator; and
- including the indicator in a new system information block indicator.

In at least some embodiments, the system information block indicator may include at least one or more of: an on/off indicator; a defined indicator including at least one dual connectivity band combination indicating to the user equipment to use the master cell group fast recovery procedure for the at least one dual connectivity band combination; and the defined indicator including at least one dual connectivity band combination triggering the user equipment to use the radio resource control re-establishment In at least some embodiments, the system information block indicator is read from at least one of: a primary cell and a primary secondary cell.

Figure 9:
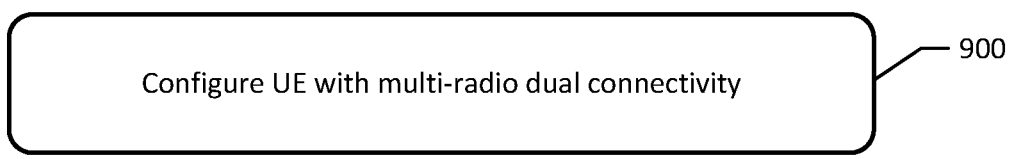

Referring to FIG. 9, in at least some embodiments, the system information block indicator may include configuring 900 the user equipment with multi-radio dual connectivity. The indicating to the user equipment may include an indication included in the configuring 900 indicating whether the user equipment should apply the master cell group fast recovery procedure when the defined criteria are met.

In at least some embodiments, the defined criteria may include a specified frequency band used by a master cell group and/or a secondary cell group.

Figure 10:
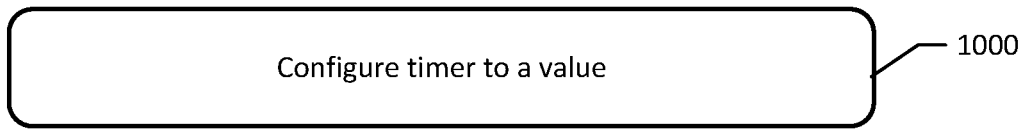

Referring to FIG. 10, further operations that may be performed by the network node may include configuring 1000 the timer to a value, wherein the value indicates to the user equipment whether the master cell group fast recovery procedure is supported In some embodiments, the operations may further include wherein the user equipment is in a multi-radio dual connectivity. The detecting 800 may include receiving from the user equipment a first indication that a radio link failure has been detected on the master cell group via a signal radio bearer to a secondary node.

Figure 11:
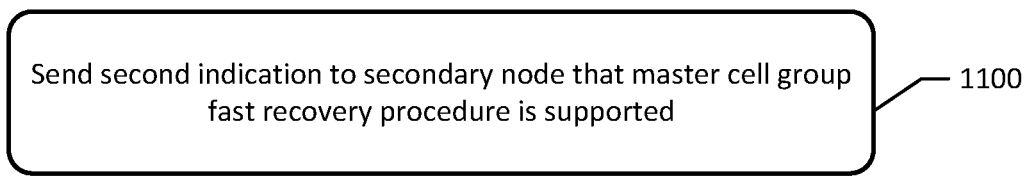

Referring to FIG. 11, in some embodiments, further operations that may performed by the network node may include sending 1100 a second indication to the secondary node that the master cell group fast recovery procedure is supported. Some embodiments provide that sending the second indication includes at least one of including the second indication in an inter-network node message and including the second indication in a message when configuring the multi-radio dual connectivity.

In at least some embodiments, the network node may be a secondary node; and the indicating 802 may include receiving a first indication from a master node that the master node does not support the master cell group fast recovery procedure; and configuring the user equipment via a signal radio bearer to perform the master cell group fast recovery procedure using the signal radio bearer.

In at least some embodiments, the indicating 802 may include applying one or more parameters of a layer of a protocol stack in a secondary cell group. The one or more parameters may include a defined number of maximum retransmissions on a radio link control set upon sending a report. The report may include a master cell group failure.

Figure 12:
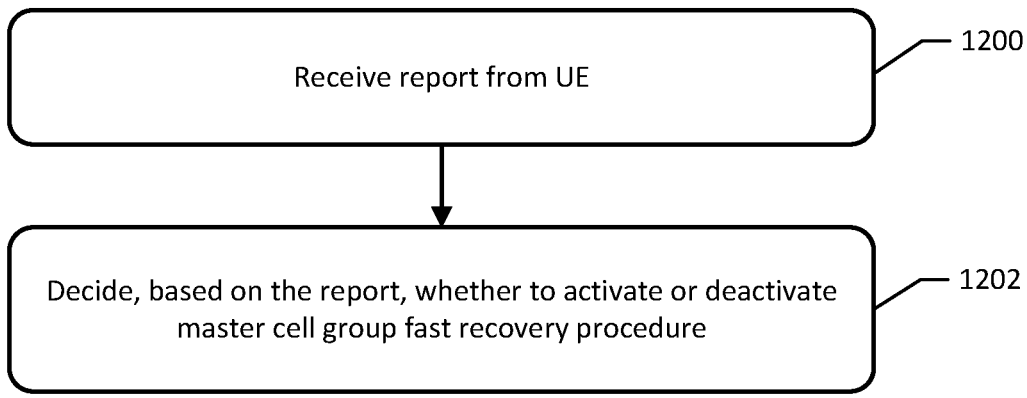

Referring to FIG. 12, in some embodiments, further operations that may be performed by the network node may include receiving 1200 a report from the user equipment. The operations may further include deciding 1202, based on the report, whether to activate or deactivate the master cell group fast recovery procedure.

In some at least some embodiments, the indicating 802 may include activating or deactivating the master cell group fast recovery procedure using a medium access control (MAC) control element including at least one of: deactivating the master cell group fast recovery procedure by default and requiring the control element to activate the master cell group fast recovery procedure; activating the master cell group fast recovery procedure by default; and changing the activating or the deactivating via the control element.

FIGS. 13-16 are flowcharts of operations that may be performed by a UE in a radio communications network (e.g., 1700 in FIG. 17) in accordance with some embodiments.

Figure 13:
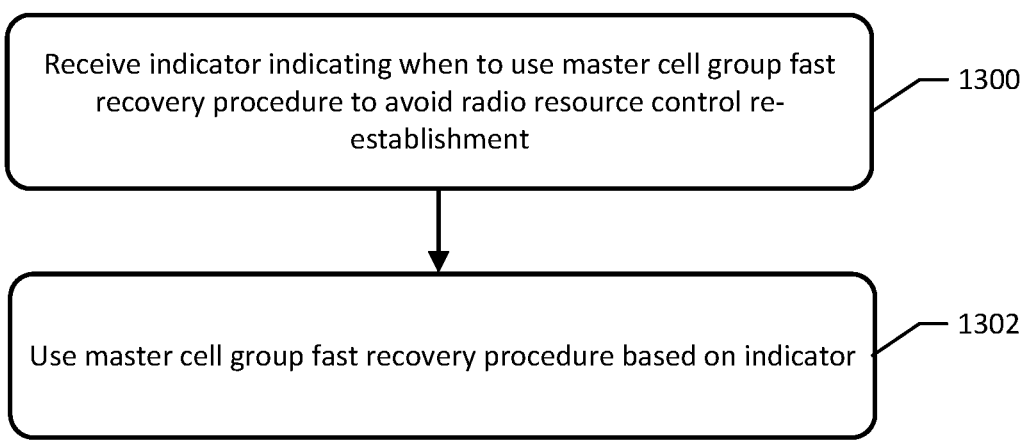
FIGS. 13 to 16 are flowcharts of operations that may be performed by a user equipment, in accordance with some embodiments of the present disclosure.

Referring to FIG. 13, the operations include receiving 1300 an indicator indicating when to use a master cell group fast recovery procedure to avoid a radio resource control re-establishment. The operations further include using 1302 the master cell group fast recovery procedure based on the indicator.

In some embodiments, the indicator may include at least one of:
- an indication that the master cell group fast recovery procedure is supported;
- an indication that the user equipment apply the master cell group fast recovery procedure when defined criteria are met;

an indication that the user equipment apply the master cell group fast recovery procedure when a timer for the master cell group fast recovery procedure is present at the user equipment;
a signal level threshold of a secondary cell group for triggering a master cell group fast recovery procedure, wherein the signal level threshold triggers the master cell group fast recovery procedure;
the presence or absence of the timer for the user equipment for the master cell group fast recovery procedure; and
the timer for the user equipment for the master cell group fast recovery procedure is configured with a value, wherein the value indicates to the user equipment whether the master cell group fast recovery procedure is supported.

In some embodiments, the receiving 1300 the indicator may include at least one of:
receiving the indicator in a radio resource connected message indicating whether that the master cell group fast recovery procedure is supported;
receiving the indicator via a dedicated radio resource control signal indicating whether that the master cell group fast recovery procedure is supported;
receiving the in an existing radio resource control message indicating whether that the master cell group fast recovery procedure is supported;
receiving the indicator in a new radio resource control message indicating whether that the master cell group fast recovery procedure is supported;
receiving the indicator in a radio resource control message via a system information block indicating whether the master cell group fast recovery procedure is supported;
receiving the indicator via a first signal radio bearer;
receiving the indicator via a split of the first signal radio bearer;
receiving the indicator via a second radio bearer;
receiving the indicator in an existing system information block indicator; and
receiving the indicator in a new system information block indicator In some embodiments, the system information clock indicator may include at least one or more of an on/off indicator; a defined indicator including at least one dual connectivity band combination indicating to the user equipment to use the master cell group fast recovery procedure for the at least one dual connectivity band combination; and the defined indicator including at least one dual connectivity band combination triggering the user equipment to use the radio resource control re-establishment.

In some embodiments, the system information clock indicator may be read from at least one of a primary cell and a primary secondary cell.

In some embodiments, the user equipment may be configured with multi-radio dual connectivity. The operations performed by the UE may further include wherein the receiving the indicator includes receiving the indicator in the configuration of the user equipment for multi-radio dual connectivity, wherein the indicator comprises an indication for whether the user equipment should use the master cell group fast recovery procedure when the defined criteria are met.

Figure 14:
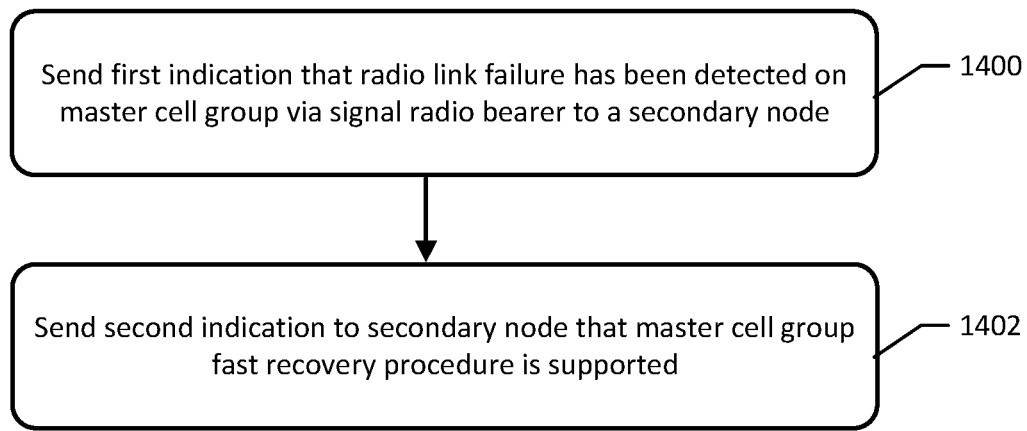

Referring to FIG. 14, the UE may be in a multi-radio dual connectivity. Further operations that may be performed by the UE can include sending 1400 a first indication that a radio link failure has been detected on the master cell group via a signal radio bearer to a secondary node. Further operations that may be performed by the UE may include sending 1402 a second indication to the secondary node that the master cell group fast recovery procedure is supported. The sending the second indication may include at least one of including the second indication in an inter-network node message and including the second indication in a message when configuring the multi-radio dual connectivity.

The indicator may include receiving a configuration via a signal radio bearer to perform the master cell group fast recovery procedure using the signal radio bearer.

Figure 15:
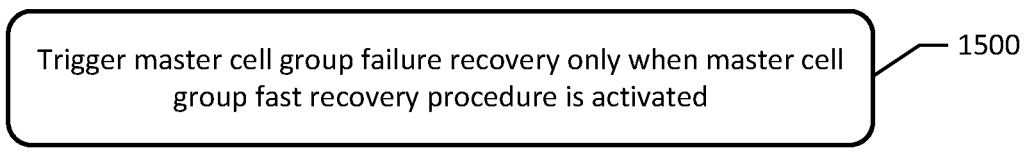

Referring to FIG. 15, further the operations that may be performed by the UE can include triggering 1500 a master cell group failure recovery only when a master cell group fast recovery procedure is activated.

Figure 16:

Referring to FIG. 16, further the operations that may be performed by the UE can include sending 1600 a report. The report may include information including one or more of: a failure of the master cell group fast recovery procedure; a configuration of the user equipment; and measurement results of the user equipment.

Figure 17:
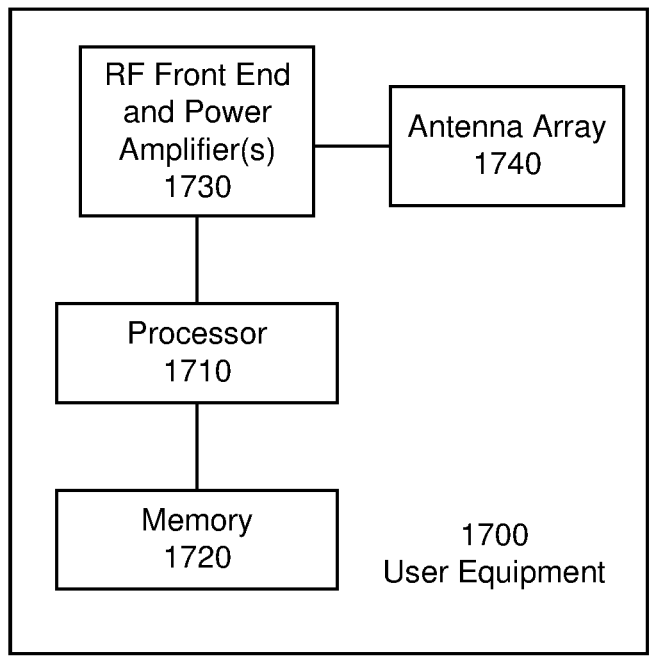
FIG. 17 is a block diagram of elements of a user equipment that are configured according to some embodiments of the present disclosure.

FIG. 17 is a block diagram illustrating an exemplary UE 1700 that is configured according to some embodiments. The UE 1700 can include, without limitation, a wireless terminal, a wireless communication device, a wireless communication terminal, a terminal node/UE/device, etc. The UE 1700 includes a RF front-end 1730 comprising one or more power amplifiers the transmit and receive through antennas of an antenna array 1740 to provide uplink and downlink radio communications with a radio network node (e.g., a base station, eNB, gNB, etc.) of a radio communications network. UE 1700 further includes at least one processor circuit 1710 (also referred to as at least one processor) coupled to the RF front end 1730 and a memory circuit 1720 (also referred to as memory). The memory 1720 stores computer readable program code that when executed by the at least one processor 1710 causes the at least one processor 1710 to perform operations according to embodiments disclosed herein.

Figure 18:
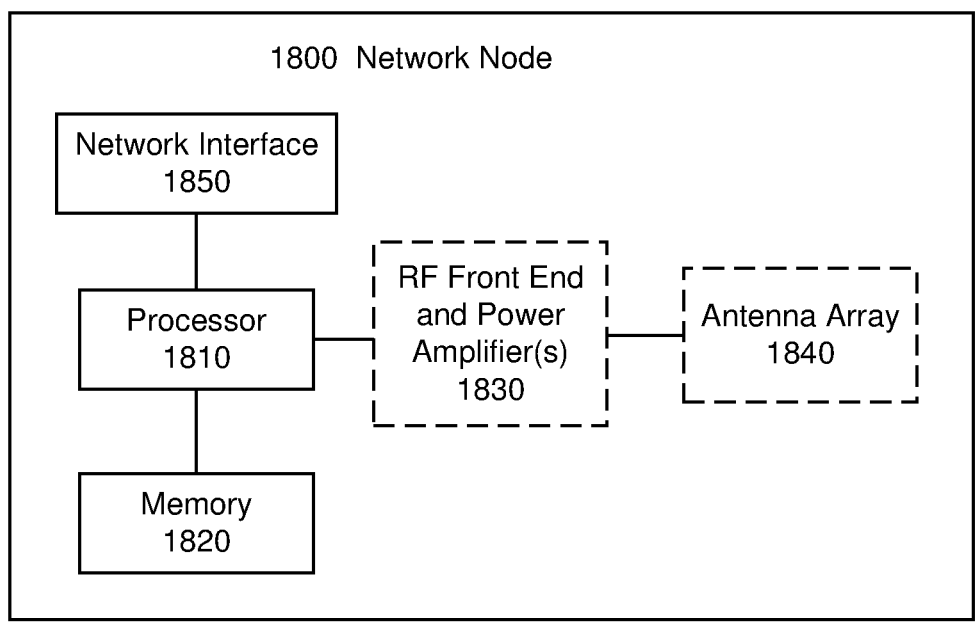
FIG. 18 is a block diagram of elements of a network node that are configured according to some embodiments of the present disclosure.

FIG. 18 is a block diagram illustrating an exemplary network node 1800 (e.g., a base station, gNB, etc.) of a radio communications network. The network node 1800 includes at least one processor circuit 1810 (also referred to as at least one processor), a memory circuit 1820 (also referred to as memory), and a network interface 1850 (e.g., wired network interface and/or wireless network interface) configured to communicate with other network nodes. The network node 1800 may be configured as a radio network node containing a RF front end with one or more power amplifiers 1830 that transmit and receive through antennas of an antenna array 1840. The memory 1820 stores computer readable program code that when executed by the at least one processor 1810 causes the at least one processor 1810 to perform operations according to embodiments disclosed herein.

Explanations are provided below for various abbreviations/acronyms used in the present disclosure.

| Abbreviations | Explanation |
| --- | --- |
| ACK | Acknowledgement |
| AP | Application Protocol |
| BSR | Buffer Status Report |
| BWP | Bandwidth Part |
| C-RNTI | Cell Radio Network Temporary Identifier |
| CA | Carrier Aggregation |
| CE | Control Element |
| CP | Control Plane |
| CQI | Channel Quality Indicator |

-continued

| Abbreviations | Explanation |
|---|---|
| DC | Dual Connectivity |
| DCI | Downlink Control Information |
| DL | Downlink |
| DRB | Data Radio Bearer |
| eNB | (EUTRAN) base station |
| E-RAB | EUTRAN Radio Access Bearer |
| FDD | Frequency Division Duplex |
| gNB | NR base station |
| GTP-U | GPRS Tunneling Protocol—User Plane |
| IP | Internet Protocol |
| LTE | Long Term Evolution |
| MCG | Master Cell Group |
| MAC | Medium Access Control |
| MeNB | Master eNB |
| MgNB | Master gNB |
| MN | Master Node |
| NACK | Negative Acknowledgement |
| NR | New Radio |
| PDCP | Packet Data Convergence Protocol |
| PCell | Primary Cell |
| PCI | Physical Cell Identity |
| PSCell | Primary SCell |
| PUSCH | Physical Uplink Shared Channel |
| RLC | Radio Link Control |
| RLF | Radio Link Failure |
| RRC | Radio Resource Control |
| SCell | Secondary Cell |
| SCG | Secondary Cell Group |
| SCTP | Stream Control Transmission Protocol |
| SeNB | Secondary eNB |
| SINR | Signal to Interference plus Noise Ratio |
| SN | Secondary Node |
| SR | Scheduling Request |
| SRB | Signaling Radio Bearer |
| SUL | Supplementary uplink |
| TDD | Time Division Duplex |
| TEID | Tunnel Endpoint IDentifier |
| TNL | Transport Network Layer |
| UCI | Uplink Control Information |
| UDP | User Datagram Protocol |
| UE | User Equipment |
| UL | Uplink |
| UP | User Plane |
| URLLC | Ultra Reliable Low Latency Communication |
| X2 | Interface between base stations |

Figure 19:
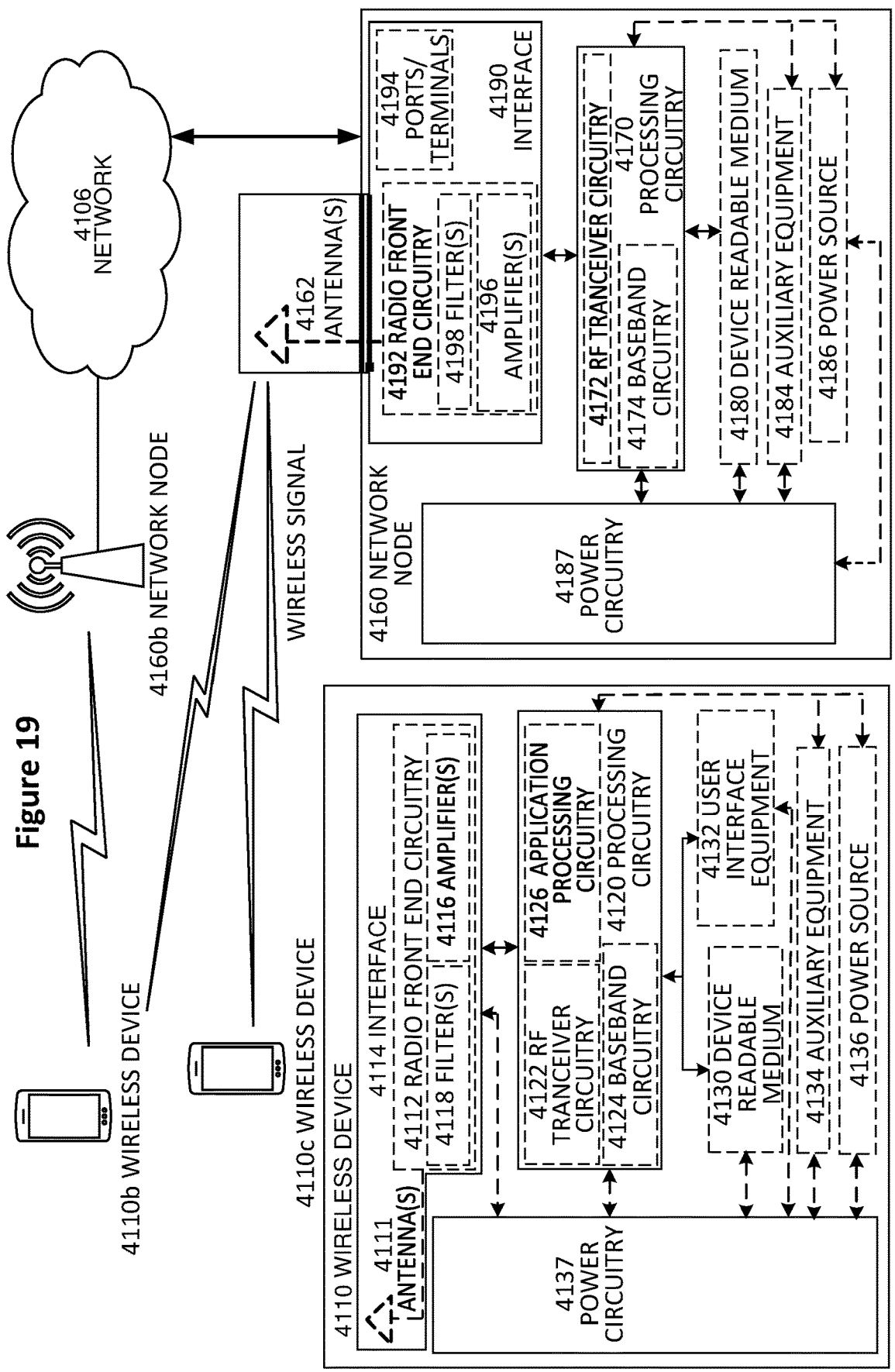
FIG. 19 is a block diagram of a wireless network in accordance with some embodiments of the present disclosure.

Reference is now made to FIG. 19, which is a schematic block diagram of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 19. For simplicity, the wireless network of FIG. 19 only depicts network 4106, network nodes 4160 and 4160b, and WDs 4110, 4110b, and 4110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system.

In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 19, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 19 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, WCDMA, LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner. In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signalling and/or data between network node 4160, network 4106, and/or WDs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or WDs via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4192 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 19 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V21), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. WD 4110 may include multiple sets of one or more of the illustrated components for different wireless technologies supported by WD 4110, such as, for example, GSM, WCDMA, LTE, NR, WiFi, WiMAX, or Bluetooth wireless technologies, just to mention a few. These wireless technologies may be integrated into the same or different chips or set of chips as other components within WD 4110.

Antenna 4111 may include one or more antennas or antenna arrays, configured to send and/or receive wireless signals, and is connected to interface 4114. In certain alternative embodiments, antenna 4111 may be separate from WD 4110 and be connectable to WD 4110 through an interface or port. Antenna 4111, interface 4114, and/or processing circuitry 4120 may be configured to perform any receiving or transmitting operations described herein as being performed by a WD. Any information, data and/or signals may be received from a network node and/or another WD. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4112 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, WD 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface 4114. Radio front end circuitry 4112 may receive digital data that is to be sent out to other network nodes or WDs via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 4110 components, such as device readable medium 4130, WD 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of WD 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a WD may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner. In any of those particular embodiments, whether executing instructions stored on a device readable storage medium or not, processing circuitry 4120 can be configured to perform the described functionality. The benefits provided by such functionality are not limited to processing circuitry 4120 alone or to other components of WD 4110, but are enjoyed by WD 4110 as a whole, and/or by end users and the wireless network generally.

Processing circuitry 4120 may be configured to perform any determining, calculating, or similar operations (e.g., certain obtaining operations) described herein as being performed by a WD. These operations, as performed by processing circuitry 4120, may include processing information obtained by processing circuitry 4120 by, for example, converting the obtained information into other information, comparing the obtained information or converted information to information stored by WD 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with WD 4110. Such interaction may be of many forms, such as visual, audial, tactile, etc. User interface equipment 4132 may be operable to produce output to the user and to allow the user to provide input to WD 4110. The type of interaction may vary depending on the type of user interface equipment 4132 installed in WD 4110. For example, if WD 4110 is a smart phone, the interaction may be via a touch screen; if WD 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into WD 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from WD 4110, and to allow processing circuitry 4120 to output information from WD 4110. User interface equipment 4132 may include, for example, a speaker, a display, vibrating circuitry, a USB port, a headphone interface, or other output circuitry. Using one or more input and output interfaces, devices, and circuits, of user interface equipment 4132, WD 4110 may communicate with end users and/or the wireless network, and allow them to benefit from the functionality described herein.

Auxiliary equipment 4134 is operable to provide more specific functionality which may not be generally performed by WDs. This may comprise specialized sensors for doing measurements for various purposes, interfaces for additional types of communication such as wired communications etc. The inclusion and type of components of auxiliary equipment 4134 may vary depending on the embodiment and/or scenario.

Power source 4136 may, in some embodiments, be in the form of a battery or battery pack. Other types of power sources, such as an external power source (e.g., an electricity outlet), photovoltaic devices or power cells, may also be used. WD 4110 may further comprise power circuitry 4137 for delivering power from power source 4136 to the various parts of WD 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case WD 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the respective components of WD 4110 to which power is supplied.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method performed by a user equipment (UE) in a radio communications network, the method comprising:
   receiving a timer configuration from a network node; and
   determining, based on the timer configuration, that a master cell group (MCG) fast recovery procedure is supported, wherein a presence of the timer configuration indicates that the MCG fast recovery procedure is supported, and wherein an absence of the timer configuration indicates that the MCG fast recovery procedure is not supported; and
   based on the determination that the MCG fast recovery procedure is supported, after a failure corresponding to the MCG, using the MCG fast recovery procedure to avoid a radio resource control (RRC) re-establishment, wherein the timer configuration corresponds to a T31x timer, and wherein the T31x timer is started upon detection of the failure corresponding to the MCG or upon a start of MCG failure recovery.

2. The method of claim 1, wherein the timer configuration is received from the network node via an RRC Reconfiguration message.

3. The method of claim 1, further comprising:
   detecting the failure corresponding to the MCG.

4. The method of claim 1, wherein the failure comprises a radio link failure (RLF).

5. The method of claim 1, further comprising:
   sending, to the network node, an MCG Failure Information message.

6. The method of claim 1, wherein the UE receives the timer configuration from the network node while the UE is in an RRC_CONNECTED state.

7. A non-transitory storage medium including program code to be executed by at least one processor of a user equipment (UE) configured to operate in a radio communication network, whereby execution of the program code causes the user equipment to perform operations comprising:
   receiving a timer configuration from a network node; and determining, based on the timer configuration, that a master cell group (MCG) fast recovery procedure is supported, wherein a presence of the timer configuration indicates that the MCG fast recovery procedure is supported, and wherein an absence of the timer configuration indicates that the MCG fast recovery procedure is not supported; and based on the determination that the MCG fast recovery procedure is supported, after a failure corresponding to the MCG, using the MCG fast recovery procedure to avoid a radio resource control (RRC) re-establishment, wherein the timer configuration corresponds to a T31x timer, and wherein the T31x timer is started upon detection of the failure corresponding to the MCG or upon a start of MCG failure recovery.

8. The non-transitory storage medium of claim 7, wherein the timer configuration is received from the network node via an RRC Reconfiguration message while the UE is in an RRC_CONNECTED state.

9. The non-transitory storage medium of claim 7, further comprising:
detecting the failure corresponding to the MCG, wherein the failure comprises a radio link failure (RLF).

10. The non-transitory storage medium of claim 7, further comprising:
sending, to the network node, an MCG Failure Information message.

11. A user equipment (UE) configured to operate in a radio communication network, comprising:
a non-transitory storage medium;
processing circuitry configured to execute instructions from the non-transitory storage medium to cause the user equipment to perform operations comprising:
receiving a timer configuration from a network node; and
determining, based on the timer configuration, that a master cell group (MCG) fast recovery procedure is supported, wherein a presence of the timer configuration indicates that the MCG fast recovery procedure is supported, and wherein an absence of the timer configuration indicates that the MCG fast recovery procedure is not supported; and
based on the determination that the MCG fast recovery procedure is supported, after a failure corresponding to the MCG, using the MCG fast recovery procedure to avoid a radio resource control (RRC) re-establishment, wherein the timer configuration corresponds to a T31x timer, and wherein the T31x timer is started upon detection of the failure corresponding to the MCG or upon a start of MCG failure recovery.

12. The user equipment of claim 11, wherein the timer configuration is received from the network node via an RRC Reconfiguration message while the UE is in an RRC_CONNECTED state.

13. The user equipment of claim 11, further comprising:
detecting the failure corresponding to the MCG, wherein the failure comprises a radio link failure (RLF).

14. The user equipment of claim 11, further comprising:
sending, to the network node, an MCG Failure Information message.

* * * * *